United States Patent
Hwang et al.

(10) Patent No.: US 10,345,992 B2
(45) Date of Patent: Jul. 9, 2019

(54) METHOD FOR DISPLAYING UNREAD MESSAGE CONTENTS AND ELECTRONIC DEVICE THEREOF

(71) Applicant: Samsung Electronics Co., Ltd., Gyeonggi-do (KR)

(72) Inventors: Soo-Ji Hwang, Gyeonggi-do (KR); Yun-Ju Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 519 days.

(21) Appl. No.: 14/011,251

(22) Filed: Aug. 27, 2013

(65) Prior Publication Data

US 2014/0075375 A1    Mar. 13, 2014

(30) Foreign Application Priority Data

Sep. 7, 2012 (KR) .................. 10-2012-0099121

(51) Int. Cl.
| | | |
|---|---|---|
| *G06F 3/048* | (2013.01) | |
| *G06F 3/0482* | (2013.01) | |
| *G06F 3/0485* | (2013.01) | |
| *H04M 1/2745* | (2006.01) | |
| *H04M 1/725* | (2006.01) | |
| *G06F 3/0484* | (2013.01) | |

(52) U.S. Cl.
CPC .......... *G06F 3/0482* (2013.01); *G06F 3/0485* (2013.01); *G06F 3/04847* (2013.01); *H04M 1/274525* (2013.01); *H04M 1/72552* (2013.01)

(58) Field of Classification Search
CPC ......... G06F 3/0483; G06F 2203/04804; G06F 1/3215; G06F 3/03547; G06F 3/0485; G06F 3/04886; G06F 3/016
USPC ........................................................ 715/784
See application file for complete search history.

(56) References Cited

U.S. PATENT DOCUMENTS

| | | | | |
|---|---|---|---|---|
| 6,297,836 | B1 * | 10/2001 | Kurashina ............. | B41J 3/4075 345/684 |
| 6,337,698 | B1 * | 1/2002 | Keely, Jr. ............. | G06F 3/0483 715/777 |
| 6,509,907 | B1 * | 1/2003 | Kuwabara ............. | G06F 3/0485 345/684 |
| 2006/0200760 | A1 * | 9/2006 | Sellers ................. | G06F 17/211 715/209 |
| 2006/0242595 | A1 | 10/2006 | Kizumi | |

(Continued)

FOREIGN PATENT DOCUMENTS

| | | |
|---|---|---|
| CN | 1759435 A | 4/2006 |
| CN | 101588411 A | 11/2009 |

(Continued)

OTHER PUBLICATIONS

Chinese Search Report dated Mar. 3, 2016.

(Continued)

*Primary Examiner* — Di Xiao
(74) *Attorney, Agent, or Firm* — Cha & Reiter, LLC.

(57) ABSTRACT

A method and an apparatus for processing unread message unread contents in an electronic device includes displaying a plurality of unread message contents for a particular application, and if all of the unread message contents is not displayable on a single screen, automatically displaying the unread message content is a scroll motion is performed.

20 Claims, 15 Drawing Sheets

(56) References Cited

U.S. PATENT DOCUMENTS

| | | | |
|---|---|---|---|
| 2006/0277504 A1 | 12/2006 | Zinn | |
| 2007/0073917 A1* | 3/2007 | Larson | G06F 3/0362 710/14 |
| 2007/0097421 A1* | 5/2007 | Sorensen | G06F 17/30265 358/1.15 |
| 2007/0128899 A1 | 6/2007 | Mayer | |
| 2007/0226646 A1* | 9/2007 | Nagiyama | G06F 3/016 715/784 |
| 2009/0293013 A1 | 11/2009 | O'Shaugnessy et al. | |
| 2009/0303204 A1 | 12/2009 | Nasiri et al. | |
| 2011/0061025 A1 | 3/2011 | Walline et al. | |
| 2012/0050807 A1* | 3/2012 | Noda | H04N 1/00411 358/1.15 |
| 2012/0266079 A1* | 10/2012 | Lee | G06F 17/30283 715/744 |

FOREIGN PATENT DOCUMENTS

| | | |
|---|---|---|
| CN | 101651736 A | 2/2010 |
| CN | 101977356 A | 2/2011 |
| GB | 2 355 143 A | 4/2001 |
| KR | 10-1998-0081371 A | 11/1998 |
| KR | 10-2008-0065162 A | 7/2008 |
| KR | 10-2009-0109582 A | 10/2009 |
| KR | 10-1115374 B1 | 2/2012 |

OTHER PUBLICATIONS

Chinese Search Report dated Sep. 23, 2016.
Korean Search Report dated Jul. 18, 2018.
European Search Report dated Sep. 25, 2018.
Korean Search Report dated Jan. 17, 2019.

\* cited by examiner

METHOD FOR DISPLAYING UNREAD MESSAGE CONTENTS AND ELECTRONIC DEVICE THEREOF

CLAIM OF PRIORITY

This application claims the benefit under 35 U.S.C. § 119(a) of a Korean patent application filed in the Korean Intellectual Property Office on Sep. 7, 2012 and assigned Serial No. 10-2012-0099121, the entire disclosure of which is hereby incorporated by reference.

BACKGROUND

1. Field of the Invention

The present disclosure relates to a method and an apparatus for displaying unread message contents.

2. Description of the Related Art

As the display size of a portable device is limited for portability, in the case where an amount of information to be displayed is great, a user typically scrolls the screen repeatedly to sift through the information. In the case where there is much dialog content to be displayed while operating a messenger service, the user also uses the scroll function to review any previous data exchanges. Such scrolling actions through multiple multi touch activations on the screen are inconvenient for the users.

Also, in the case where the user executes a message service in order to view an unread message including new messages, the electronic device typically displays a most recently received message. However, if the user wishes to review an earliest unread message among multiple unread messages, the user has inconvenience of having to repeatedly perform a touch input in order to find out the earliest unread message.

SUMMARY

An aspect of the present invention is to address at least the above-mentioned problems and/or disadvantages and to provide at least the advantages described below. Accordingly, an aspect of the present invention is to provide an apparatus and a method for displaying unread message contents in an electronic device.

Another aspect of the present invention is to provide an apparatus and a method for performing an automatic scroll function for providing unread message contents in an electronic device.

Still another aspect of the present invention is to provide an apparatus and a method for displaying unread message contents from different applications in an electronic device.

displaying incoming messages in an electronic device, the method includes: selecting a particular application including a plurality of unread messages; displaying the plurality of unread messages for the selected application; and when all of the plurality of unread messages is not displayed on a single screen of the electronic device, automatically displaying the plurality of unread messages in a scrolling motion at a predetermined rate.

In accordance with another aspect of the present invention, an apparatus for displaying unread contents includes at least one processor, at least one touchscreen, at least one memory, and at least one program stored in the memory and configured for execution by the at least one processor, wherein the program comprises at least one instruction for selecting a particular application including a plurality of unread messages, displaying the plurality of unread messages for the selected application, and when all of the plurality of unread messages is not displayable on a single screen, automatically displaying the plurality of unread messages in a scrolling motion at a predetermined rate.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

It should be noted that the terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a technology for displaying unread message contents in an electronic device having a touchscreen. Here, the contents include at least one of a message service providing read/unread information, a messenger service, an e-mail service, and an e-book service.

In the following description, the electronic device includes a mobile communication terminal, a Personal Digital Assistant, (PDA), a laptop, a smart phone, a netbook, a television, a Mobile Internet Device (MID), an Ultra Mobile Personal Computer (UMPC), a tablet PC, a smart TV, a navigator, any duplex system, and an MP3 player having a touchscreen.

Figure 1:
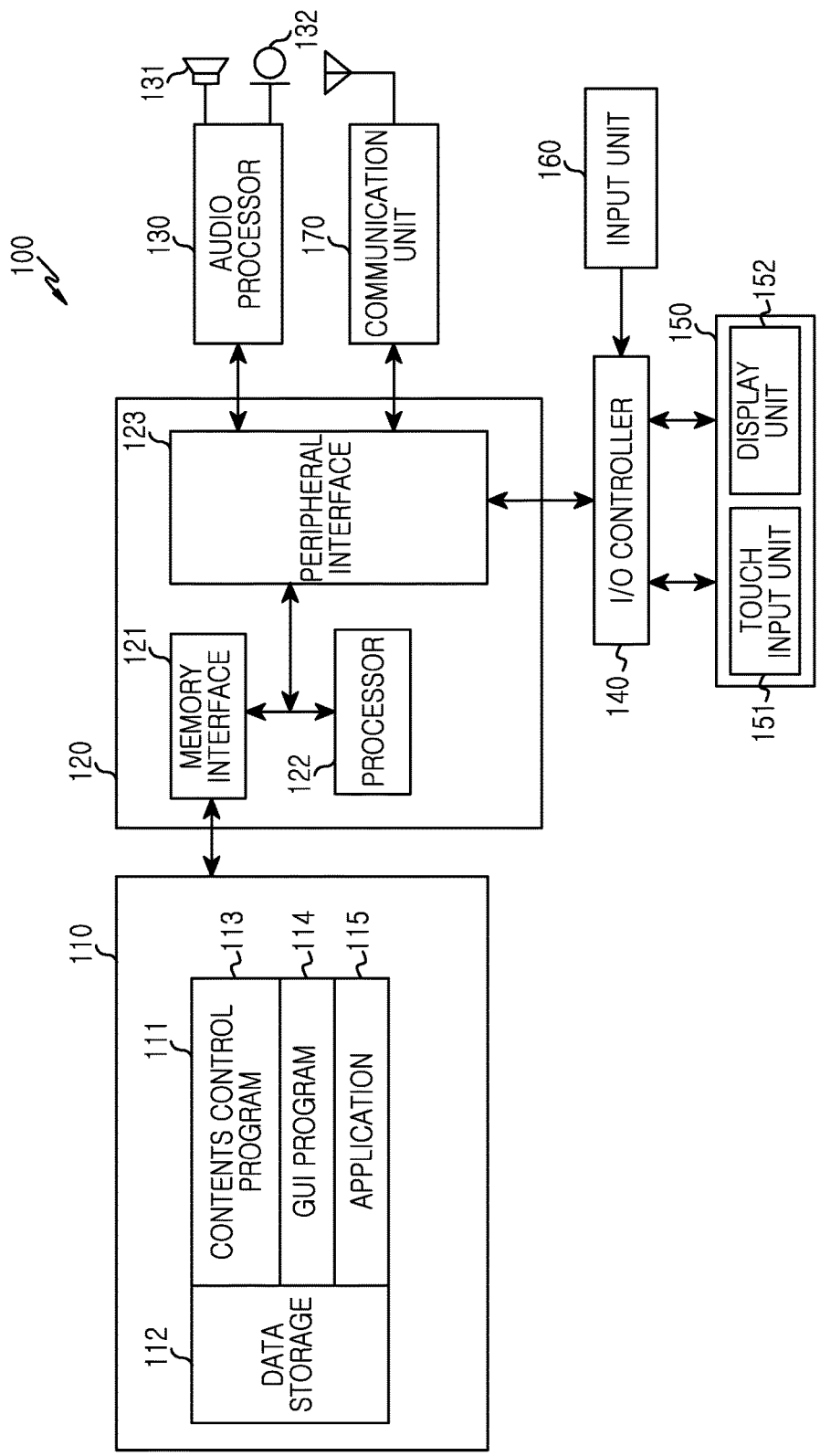
FIG. 1 is a block diagram illustrating an electronic device according to an embodiment of the present invention.

FIG. 1 is a block diagram illustrating an electronic device according to an embodiment of the present invention.

Referring to FIG. 1, the electronic device 100 includes a memory 110, a processor unit 120, an audio processor 130, an Input/Output (I/O) controller 140, a touchscreen 150, 30 and an input unit 160. In the embodiment, a plurality of memories 110 may be implemented.

The memory 110 may include a program storage 111 for storing a program for controlling an operation of the electronic device 100 and a data storage 112 for storing data occurring during execution of a program. For example, the program storage 111 includes a contents control program 113, a GUI program 114, and at least one application 115. Here, a program included in the program storage 111 is a set of instructions and may be expressed as an instruction set.

Figure 6A:
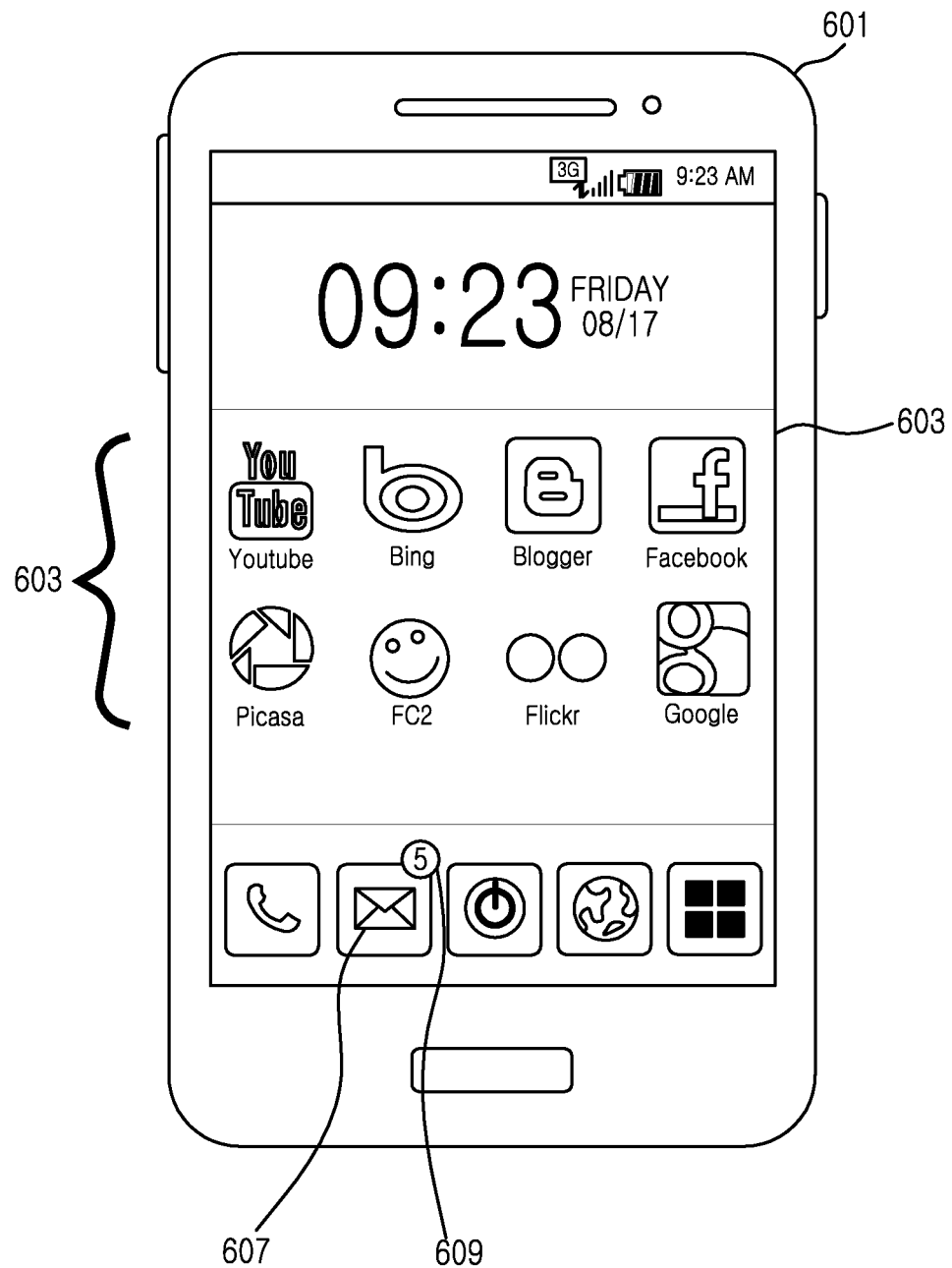
FIGS. 6A, 6B, 6C, and 6D are views illustrating a screen configuration for displaying unread message contents in an electronic device according to an embodiment of the present invention.

The contents control program 113 includes at least one software element for detecting unread message contents in an application. For example, as illustrated in FIG. 6A, in the case where the message application 607 is executed, the contents control program 113 detects a message unread by a user depending on read/unread status indication.

The contents control program 113 includes at least one software element for controlling an automatic scrolling of unread message contents. Additionally, the contents control program 113 includes at least one software element for providing a content control menu for scrolling unread message contents.

Additionally, the contents control program 113 includes at least one software element for allowing a user to view unread message contents of different contents or different applications. For example, the contents control program 113 determines whether the "next frame" icon 671 of the contents control menu 661 is touched for a reference time or longer in FIG. 6C. For another example, the contents control program 113 determines whether an icon for viewing unread content of second contents is selected. For still another example, the contents control program 113 may determine whether an unread content determine event of the second contents occurs based on input information of a hardware button. For yet another example, the contents control program 113 may determine whether an unread content determine event of the second contents occurs based on input information of a hardware button and movement information of the electronic device. For still yet another example, the contents control program 113 may determine whether an unread content determine event of the second contents occurs based on touch information of the touchscreen. For further another example, the contents control program 113 may determine whether an unread content determine event of the second contents occurs based on touch information of the touchscreen and movement information of the electronic device.

Figure 6B:
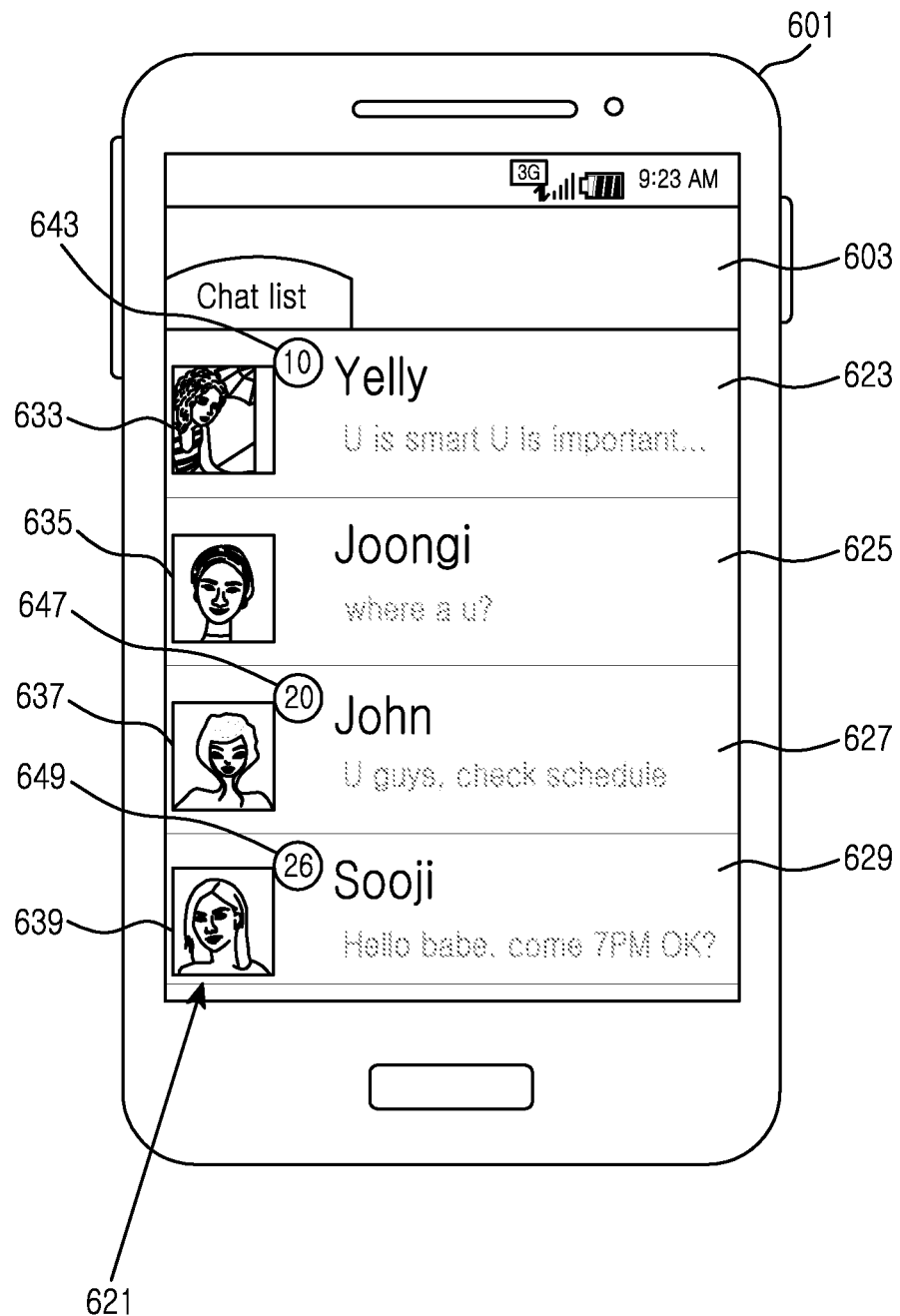
Figure 6C:
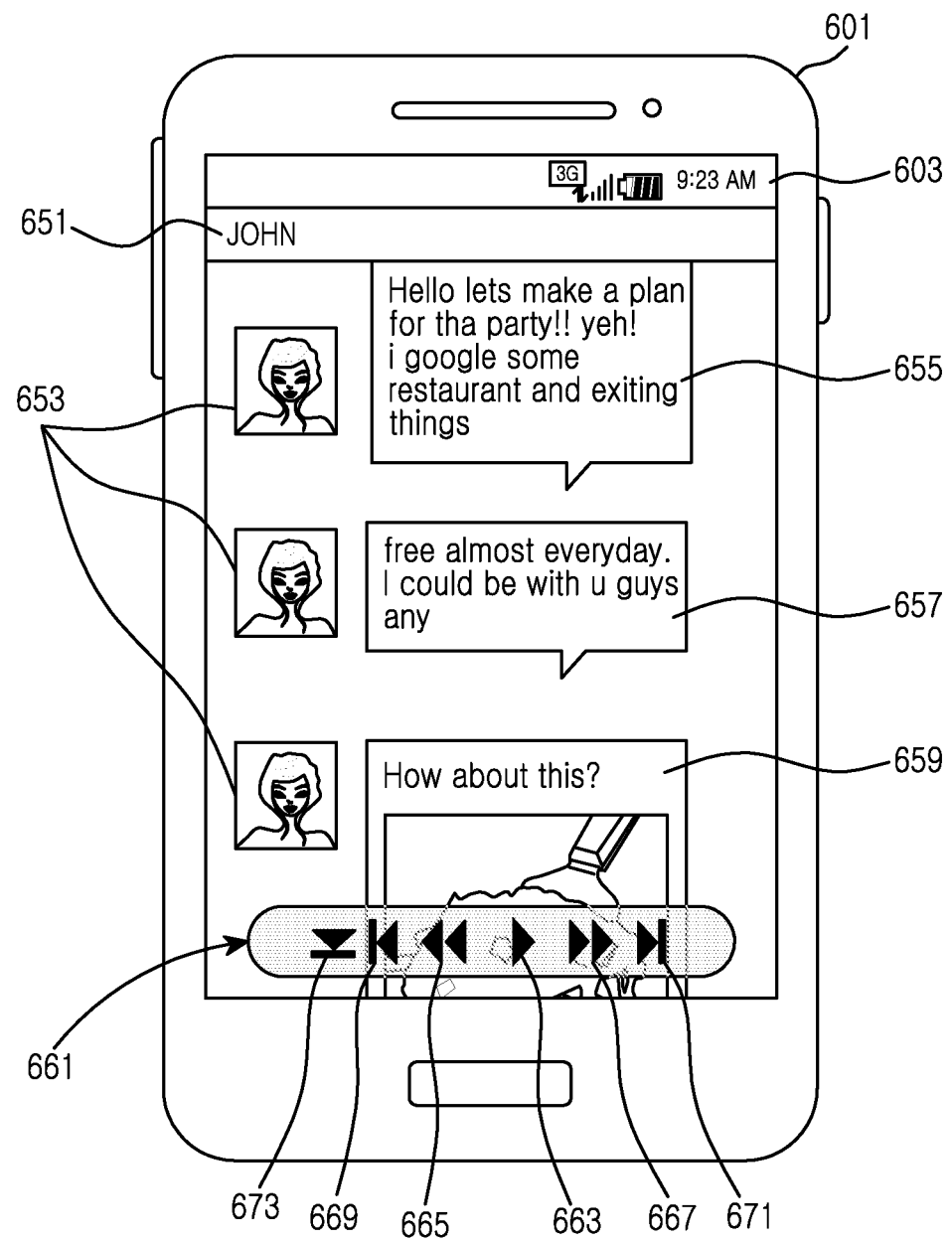
Figure 6D:
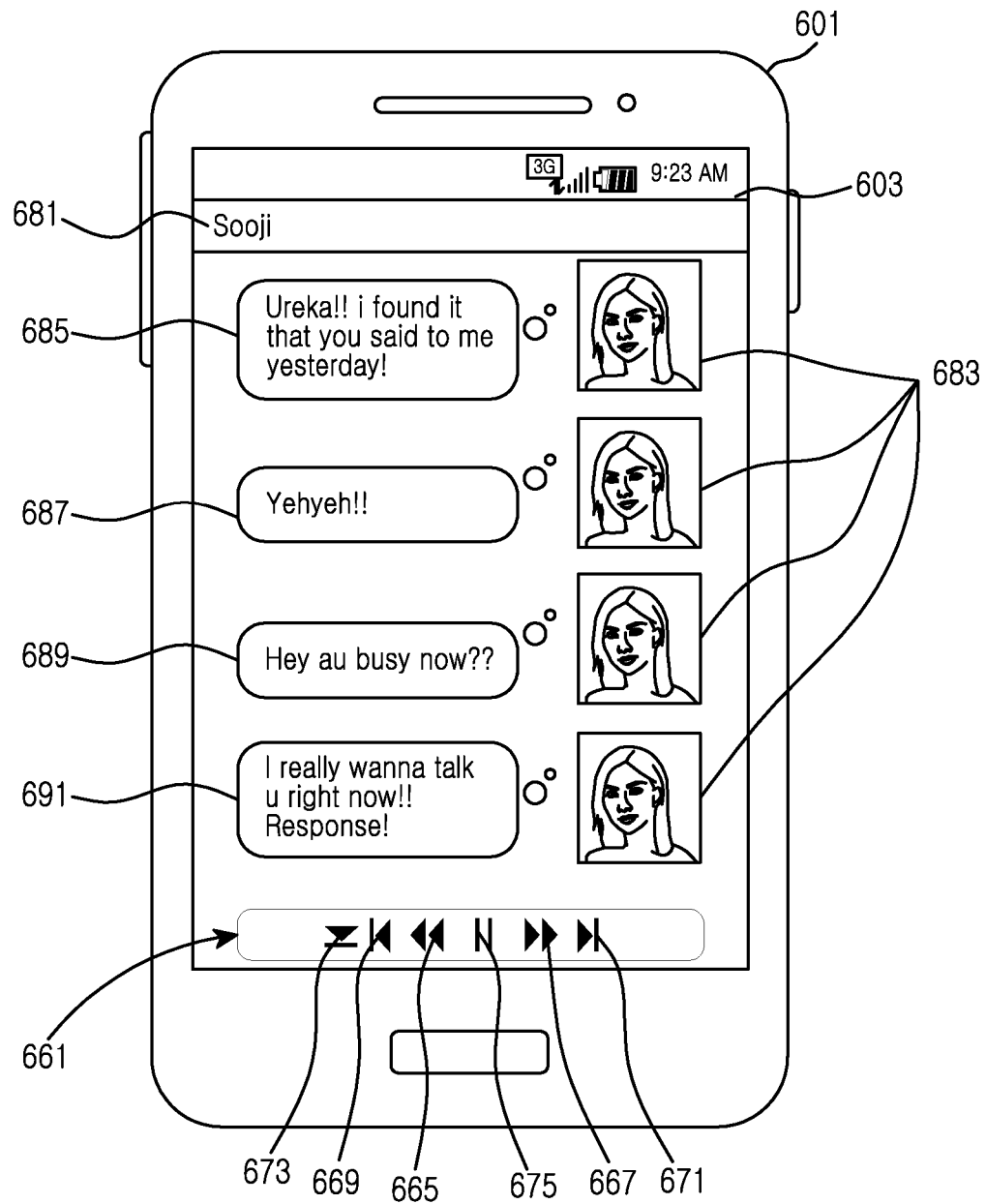

The GUI program 114 includes at least one software element for providing a graphical user interface on the display unit 152. For example, in the case where unread message contents is detected by the contents control program 113, the GUI program 114 controls to display unread message contents on the display unit 152. For another example, in the case where an automatic scrolling is performed by the contents control program 113, the GUI program 114 controls to update the screen for displaying a message on the display unit 152 as automatic scrolling of unread message contents is performed. For still another example, in the case where the contents control menu is provided by the contents control program 113, the GUI program 114 controls to display the content control menu 661 including the "reproduce" icon 663, the "slow" icon 665, the "fast" icon 667, the "previous frame" icon 669, the "next frame" icon 671, and the "display all" icon 673 as illustrated in FIG. 6C. At this point, the GUI program 114 may display the content control menu 661 so that a message 659 is shown as illustrated in FIG. 6C. Also, the GUI program 114 may display the contents control menu 661 separately from a message as illustrated in FIG. 6D.

The application 115 includes a software element for at least one application installed in the electronic device 100.

The processor unit 120 includes a memory interface 121, at least one processor 122, and a peripheral interface 123. Here, the memory interface 121, the at least one processor 122, and the peripheral interface 123 included in the processor unit 120 may be integrated in at least one integrated circuit or implemented as separate elements.

The memory interface 121 controls an access of elements like the processor 122 or the peripheral interface 123 to the memory 110.

The peripheral interface 123 controls connection between I/O peripheral devices of the electronic device 100, the processor 122, and the memory interface 121.

Figure 2:
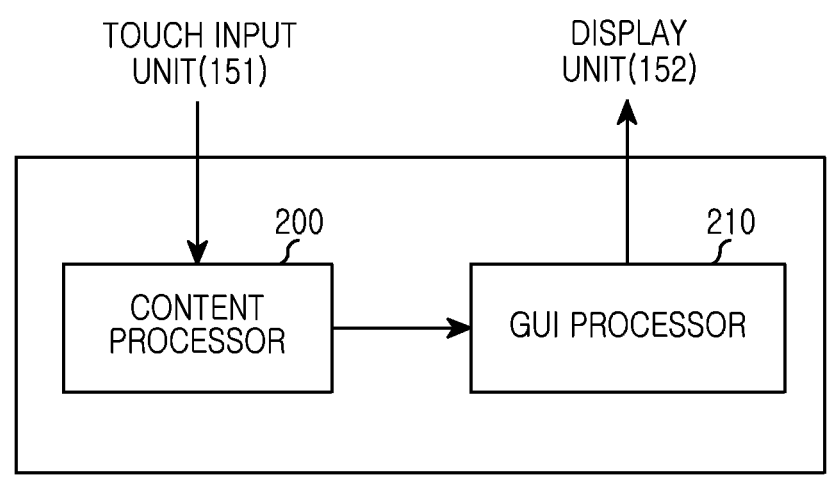
FIG. 2 is a detailed block diagram illustrating a processor according to an embodiment of the present invention.

The processor 122 controls the electronic device 100 to provide various multimedia services using at least one software program. To this end, the processor 122 executes at least one program stored in the memory 110 to control to provide a service depending on the relevant program. For example, the processor 122 may be configured as illustrated in FIG. 2 in order to execute the contents control program 113 and control unread message contents.

The audio processor 130 provides an audio interface between a user and the electronic device 100 via a speaker 131 and a microphone 132.

The I/O controller 140 provides an interface between an I/O unit such as a touchscreen 150 and the input unit 160, and the peripheral interface 123.

The touchscreen 150 is an I/O unit for outputting/inputting information, and includes a touch input unit 151 and a display unit 152.

The touch input unit 151 provides touch information detected via a touch panel to the processor unit 120 via the I/O controller 140. At this point, the touch input unit 151 provides touch information by an electronic pen or a finger to the processor unit 120 via the I/O controller 140.

The display unit 152 displays the state information of the electronic device 100, a character input by a user, a moving picture, a still picture, etc. For example, the display unit 152 displays display data provided from the GUI program 114.

The input unit 160 provides input data generated by the user's selection to the processor unit 120 via the I/O controller 140. For example, the input unit 160 includes only a control button for controlling the electronic device 100. For another example, the input unit 160 may be configured using a keypad for receiving input data from a user.

The communication unit 170 includes a communication system for performing a communication function for voice communication and data communication. At this point, the communication unit 170 may be divided into a plurality of communication submodules supporting different communication networks, respectively. For example, though not limited thereto, the communication network includes a Global System for Mobile Communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, Near Field Communication (NFC), etc.

FIG. 2 is a detailed block diagram illustrating a processor according to an embodiment of the present invention.

As illustrated in FIG. 2, the processor 122 may include a content processor 200 and a GUI processor 210.

The content processor 200 executes the contents control program 113 of the program storage 111 to control an application to detect unread message contents. For example, as illustrated in FIG. 6A, in the case where the message application 607 is executed, the content processor 200 detects a message unread by a user based on read/unread status indication, which include includes a caller ID or a caller phone number, content, a reception time, and read/unread information.

The content processor 200 executes the contents control program 113 of the program storage 111 to control an automatic scrolling of the unread message contents. For example, as illustrated in FIG. 6C, in the case where all of unread messages 655, 657, 659 among messages received from "John" 651 are not displayed or displayable on the touchscreen 603, the contents control program 113 control to automatically scroll the contents on the screen in order to display the unread messages not displayed or displayable on the touchscreen 603. Here, the content processor 200 may temporarily delay the scroll speed depending on the display area of one of the messages being displayed. For example, when the display area of a particular message greater than a predetermined threshold size is detected, the content processor 200 temporarily delays the scrolling speed by a predetermined rate. When the message having the display area of the predetermined threshold or greater disappears from the screen, the content processor 200 returns to the earlier scrolling speed. Alternatively, when the display area of a particular message is less than a predefined threshold size, the scrolling speed can be increased by a predefined rate, and then return to the earlier rate once the message moving at the increased rate disappears from the screen.

The GUI processor 210 executes the GUI program 114 of the program storage 111 to provide a user interface using graphics on the display unit 152. For example, when unread message contents are detected by the content processor 200, the GUI processor 210 controls to display the unread message contents on the display unit 152. For another example, in the case where automatic scrolling is performed by the content processor 200, the GUI processor 210 controls to update the screen on the display unit 152 For another example, in the case where the content control menu is provided by the content processor 200, the GUI processor 210 controls to display the content control menu 661 including the "reproduce" icon 663, the "slow" icon 665, the "fast" icon 667, the "previous frame" icon 669, the "next frame" icon 671, and the "display all" icon 673 as illustrated in FIG. 6C. Also, the GUI processor 210 may display the content control menu 661 on a separate region so as not to overlap with the unread message contents as illustrated in FIG. 6D.

In the above embodiment, the content processor 200 of the electronic device executes the contents control program 113 to control unread message contents. In another embodiment, the electronic device may include a separate content processor including the contents control program 113.

Figure 3A:
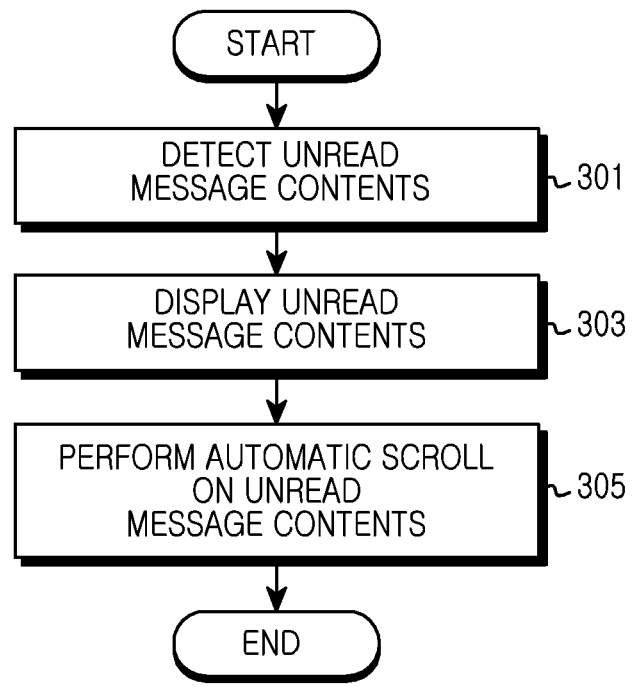
FIG. 3A is a flowchart illustrating a procedure for displaying unread message contents in an electronic device according to an embodiment of the present invention.

FIG. 3A illustrates a procedure for displaying unread messages in an electronic device according to an embodiment of the present invention.

Referring to FIG. 3A, the electronic device detects unread messages in step 301.

For example, as illustrated in FIG. 6A, in the case where the message application 607 is executed, the electronic device detects a number of messages unread by a user based on read/unread status indication included in each message source, which includes a caller ID, a caller phone number, content, a reception time, and read/unread information. For example, as illustrated in FIG. 6B, the electronic device displays a dialog partner list 621 including one or more dialog partners 623, 625, 627, 629, profile images 633, 635, 637, 639, and indicators 643, 647, 649. Here, the indicator may represent the number of unread messages.

After detecting at least one unread message, the electronic device proceeds to step 303 to display the unread messages. For example, as illustrated in FIG. 6B, when "John" 627 is selected from the dialog partner list 621, the electronic device displays a dialog window "John" via the touchscreen 603 as illustrated in FIG. 6C (651). At this point, the electronic device 601 displays one or more unread messages 655, 657, 659 among messages received from "John". At this point, the electronic device 601 may display messages from a most recently received message or display messages from an oldest message received previously with time reference at which a message has been received from "John".

After displaying the unread messages, the electronic device proceeds to step 305 to perform an automatic scrolling of the unread messages a specified rate. For example, in the case where all of the unread messages 655, 657, 659 among the messages received from "John" are not displayed on the touchscreen 603, the electronic device automatically scrolls the contents on the screen in order to display the unread messages not displayed on the touchscreen 603, as shown in FIG. 6C. At this point, the electronic device may temporarily delay the scrolling speed depending on the display area needed for displaying a particular message. For example, when the display area of a message greater than a predetermined threshold size is detected, the electronic device temporarily delays the scrolling speed so that a user can have enough time to review the content being displayed. When the display area greater than the predetermined screen threshold size disappears or exits from the screen, the electronic device reverts back to the earlier scrolling speed. At this point, as illustrated in FIG. 6C, the electronic device displays the content control menu 661. Here, the content control menu 661 includes the "reproduce" icon 663 for performing an automatic scroll mode at a specific rate, the "slow" icon 665 for lowering the scrolling rate, the "fast" icon 667 for raising the scrolling rate, the "previous frame" icon 669 for displaying the contents of a previous screen from a currently displayed screen, the "next frame" icon 671 for displaying the contents of a next screen from a currently displayed screen, and the "display all" icon 673 for displaying a screen of a last unread message.

Figure 3B:
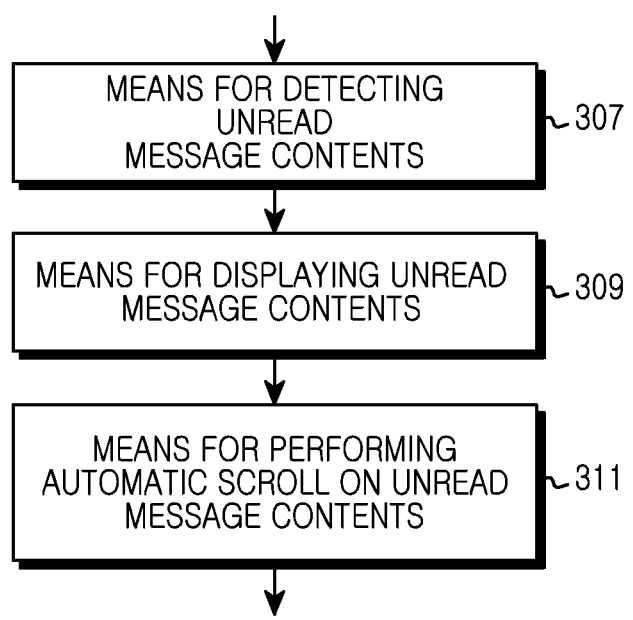
FIG. 3B is a view illustrating the configuration of an electronic device for displaying unread message contents according to an embodiment of the present invention.

As described above, respective procedures for displaying unread contents in an electronic device may be configured using means for displaying unread message in an electronic device as illustrated in FIG. 3B.

FIG. 3B is a view illustrating the configuration of an electronic device for displaying unread contents according to an embodiment of the present invention.

Referring to FIG. 3B, the electronic device includes first means 307 for detecting unread content of at least one contents, second means 309 for displaying unread content of contents, and third means 311 for performing automatic scroll on the unread content of the contents.

As shown, the electronic device includes the respective means for displaying unread contents. At this point, the respective means for displaying unread contents in the electronic device may be configured as one means.

Figure 4:
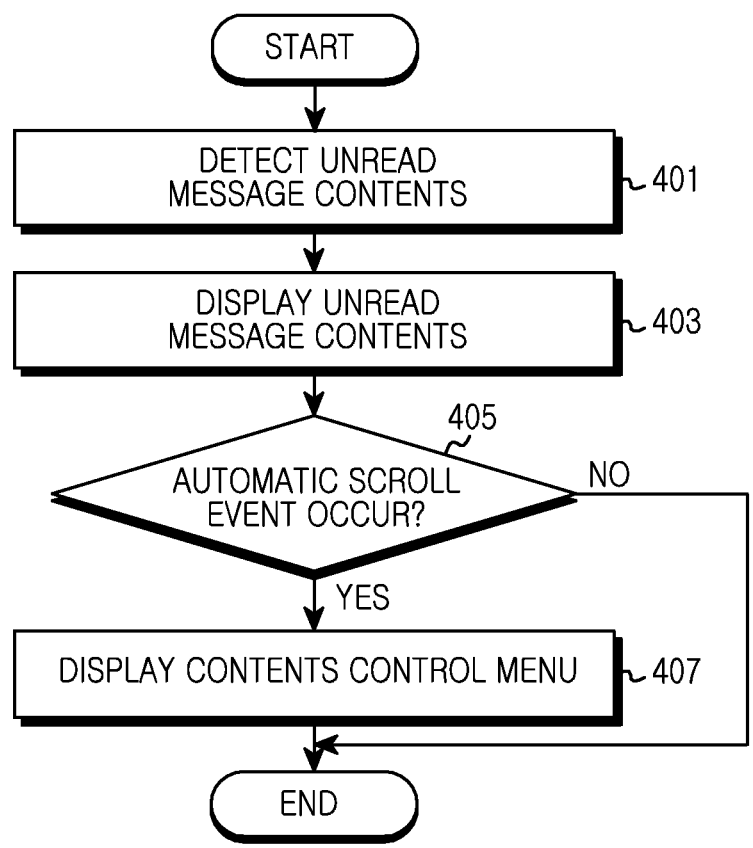
FIG. 4 is a flowchart illustrating a procedure for displaying unread message contents in an electronic device according to an embodiment of the present invention.

FIG. 4 illustrates a procedure for displaying unread message contents in an electronic device according to an embodiment of the present invention.

Referring to FIG. 4, the electronic device detects unread message s in step 401. For example, as illustrated in FIG. 6A, when the message application 607 is executed, the electronic device detects a message unread by a user depending on read/unread status indication. As illustrated in FIG. 6B, the electronic device displays the dialog partner list 621 including one or more dialog partners 623, 625, 627, 629, the profile images 633, 635, 637, 639, and the indicators 643, 647, 649. Here, the indicator may represent the number of unread messages.

After detecting at least one unread message, the electronic device proceeds to step 403 to display the unread messages. For example, as illustrated in FIG. 6B, in the case where "John" 627 is selected from the dialog partner list 621, the electronic device displays a dialog window of "John" via the touchscreen 603 as illustrated in FIG. 6C (651). At this point, the electronic device 601 displays one or more unread messages 655, 657, 659 among messages received from "John". At this point, the electronic device 601 may display messages from a most recently received message or display messages from an oldest message received previously with time reference at which the message has been received from "John".

After displaying the unread message contents, the electronic device proceeds to step 405 to determine whether an automatic scroll event occurs. For example, as illustrated in FIG. 6C, in the case where all of the unread messages 655, 657, 659 among the messages received from "John" are not displayed on the touchscreen 603, the electronic device recognizes that it needs to automatically scroll the unread messages on the touchscreen 603.

When an automatic scroll event occurs, the electronic device proceeds to step 407 to display a content control menu.

Figure 5:
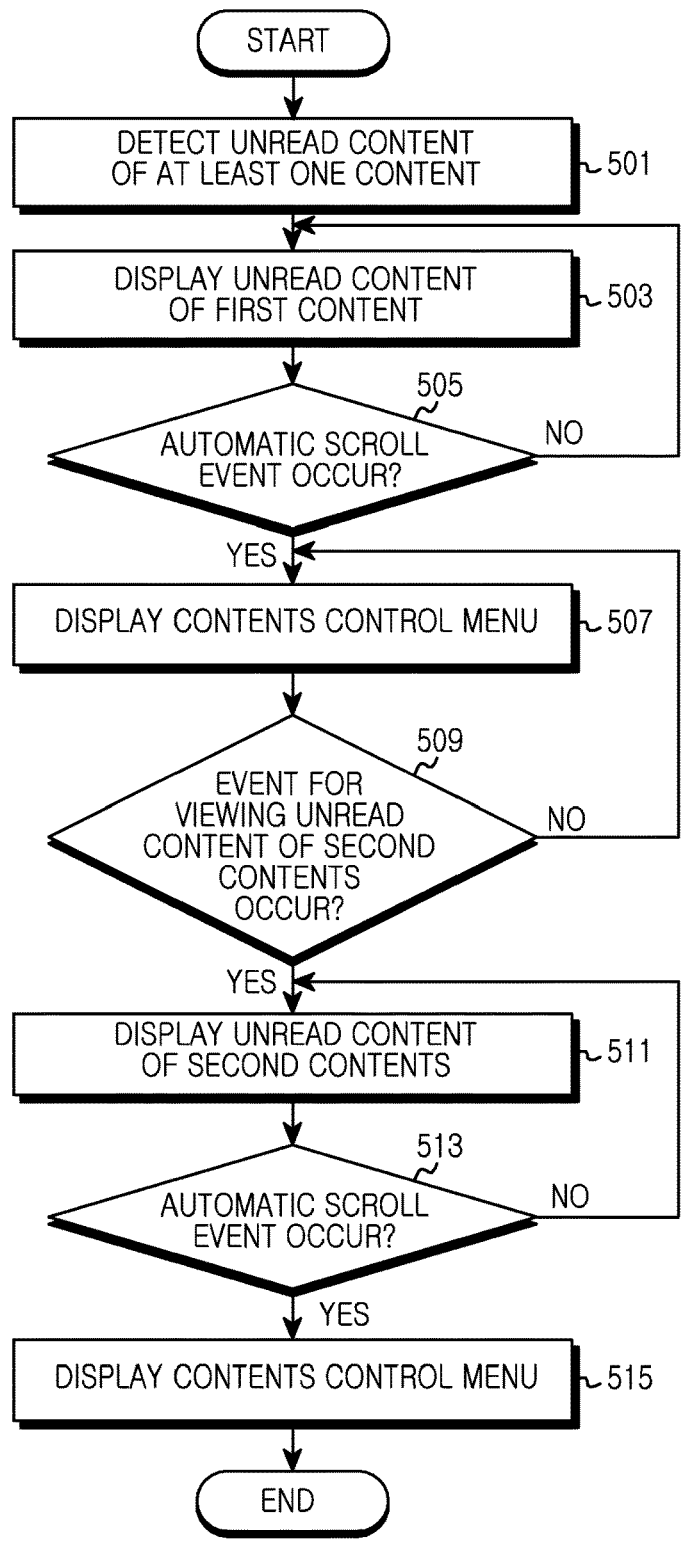
FIG. 5 is a flowchart illustrating a procedure for displaying unread message contents of different applications in an electronic device according to an embodiment of the present invention.

FIG. 5 illustrates a procedure for displaying unread message contents of different applications in an electronic device according to an embodiment of the present invention.
Referring to FIG. 5, the electronic device detects at least one unread message in step 501. For example, as illustrated in FIG. 6A, in the case where the message application 607 is executed, the electronic device detects a message unread by a user depending on read/unread status indicator.

After detecting unread message contents, the electronic device proceeds to step 503 to display the unread content of first contents. For example, as illustrated in FIG. 6B, when "John" 627 is selected from the dialog partner list 621, the electronic device 601 displays a dialog window of "John" via the touchscreen 603 as illustrated in FIG. 6C (651). Here, the electronic device 601 displays one or more unread messages 655, 657, 659 among messages received from "John". At this point, the electronic device 601 may display messages from a most recently received message or display messages from an oldest message received long ago with time reference at which a message has been received from "John".

After displaying unread content of the first contents, the electronic device proceeds to step 505 to determine whether an automatic scroll event occurs. For example, as illustrated in FIG. 6C, in the case where all of the unread messages 655, 657, 659 among the messages received from "John" are not displayed on the touchscreen 603, the electronic device recognizes that it needs to automatically scroll the content on the screen in order to display the unread messages.

When an automatic scroll event occurs, the electronic device proceeds to step 507 to display a content control menu, as described earlier.

After displaying the content control menu, the electronic device proceeds to step 509 to determine whether an event for viewing unread content of second contents occurs. For example, as illustrated in FIG. 6C, the electronic device determines whether a touch for the "next frame" 671 of the contents control menu 661 is detected for a reference time or longer. Alternatively, the electronic device determines whether an icon for viewing unread content of the second contents is selected. Alternatively, the electronic device may determine whether an unread content determine event of the second contents occurs with consideration of input information of a hardware button. Alternatively, the electronic device may determine whether an unread content determine event of the second contents occurs with consideration of input information of the hardware button and movement information of the electronic device. Alternatively, the electronic device may determine whether an unread content determine event of the second contents occurs with consideration of touch information for the touchscreen. Alternatively, the electronic device may determine whether an unread content determine event of the second contents occurs with consideration of the touch information for the touchscreen and the movement information of the electronic device.

When the unread content determines event of the second contents occurs, the electronic device proceeds to step 511 to display unread contents of a second application. For example, as illustrated in FIG. 6B, when the "next frame" 671 or any of earlier mentioned event occurs to activate the display of second contents. the electronic device displays a dialog window of "sooji" 629 where unread messages exist next to "John" 627 in the dialog partner list 621 via the touchscreen 603 as illustrated in FIG. 6D (681). At this point, the electronic device 601 displays one or more unread messages 685, 687, 689, 691 among messages received from "sooji". For example, the electronic device 601 may display messages from a most recently received message or display messages from an oldest message received previously with time reference at which a message has been received from "sooji".

After displaying unread content of the second contents, the electronic device proceeds to step 513 to determine whether an automatic scroll event occurs. For example, as illustrated in FIG. 6D, in the case where all of the unread messages 685, 687, 689, 691 among the messages received from "sooji" are not displayed on the touchscreen 603, the electronic device recognizes that it needs to automatically scroll the content in order to display the unread messages not displayed on the touchscreen 603.

When an automatic scroll event occurs, the electronic device proceeds to step 515 to display the content control menu. Here, as illustrated in FIG. 6D, the contents control menu 661 includes a "pause" icon 675 for temporarily suspending the automatic scrolling, the "slow" icon 665 for lowering a screen switching speed of the automatic scrolling, the "fast" icon 667 for raising a screen switching speed of the automatic scrolling, the "previous frame" icon 669 for displaying the previous screen by a currently displayed screen, the "next frame" icon 671 for displaying the next screen by a currently displayed screen, and the "display all" icon 673 for displaying a screen of a last unread message. At this point, as illustrated in FIG. 6C, the electronic device may display the content control menu 661 so that the message 659 is viewed. Also, as illustrated in FIG. 6D, the electronic device may display the content control menu 661 on a separate region not to overlap with the unread message contents.

In the above embodiment, the electronic device scrolls unread messages on a message basis and displays the same. In another embodiment, the electronic device may scroll the unread messages on a pixel in a row and display the same. Here, the electronic device may store unread messages in a buffer at a time, and scroll and display the same. Also, the electronic device may store unread messages in a buffer and scroll and display the same whenever it displays the unread messages.

FIG. 6A illustrates the configuration of an electronic device according to an embodiment of the present invention. Referring to FIG. 6A, the electronic device 601 may include a mobile communication terminal, a Personal Digital Assistant, (PDA), a laptop, a smart phone, a netbook, a television, a Mobile Internet Device (MID), an Ultra Mobile Personal Computer (UMPC), a tablet PC, a smart TV, a navigation, and an MP3 player having a touchscreen. The touchscreen 603 displays at least one icon 605 (and an object). At this point, when detecting a touch input for the at least one icon 605 (and the object) displayed on the touchscreen 603, the electronic device 601 may execute an application corresponding to the selected at least one icon 605 (and the object). A portion of the touchscreen 603 includes a menu bar 611. Icons frequently used by a user may be arranged on the menu bar 611. For example, when detecting a touch for the messenger icon 607, the electronic device 601 executes the messenger application as illustrated in FIG. 6B. Here, 609 is an indicator representing the number of dialog lists including unread messages of the messenger using an indicator.

When the messenger application is executed, the electronic device 601 displays the dialog partner list 621 including one or more dialog partners 623, 625, 627, 629, the profile images 633, 635, 637, 639, and the indicators 643, 647, 649 via the touchscreen 603 as illustrated in FIG. 6B.

In the case where "John" 627 is selected from the dialog partner list 621 of the messenger program, the electronic device 601 displays a dialog window of "John" via the touchscreen 603 as illustrated in FIG. 6C (651). At this point, the electronic device 601 displays one or more unread dialogs 655, 657, 659 among dialogs received from "John". For example, the electronic device 601 may display messages from a most recently received message or display messages from an oldest message received long ago with time reference at which a message has been received from "John".

In the case where all of the unread messages 655, 657, 659 among the messages received from "John" are not displayed on the touchscreen 603, the electronic device displays the contents control menu 661 in order to display the unread dialogs not displayed on the touchscreen 603. Here, the electronic device may automatically perform scrolling at a predetermined rate in order to display those not displayed unread dialogs. At this point, the electronic device may temporarily delay the scroll speed depending on the display area needed for one of the dialogs. For example, when detecting the display area of a particular dialog needs a greater than a predetermined threshold size, the electronic device temporarily delays the scroll speed by a predetermined amount. When such a dialog requiring a display area greater than the threshold size disappears from the screen, the electronic device can change back to the earlier scrolling speed.

When detecting a touch input for the "next frame" icon 671 for the reference time or longer, as illustrated in FIG. 6B, the electronic device displays a dialog window of "sooji" 629 where unread dialogs exist next to "John" 627 in the dialog partner list 621 via the touchscreen 603 as illustrated in FIG. 6D (681). At this point, the electronic device 601 displays one or more unread dialogs 685, 687, 689, 691 among dialogs received from "sooji". For example, the electronic device 601 may display messages from a most recently received message or display messages from an oldest message received long ago with time reference at which a message has been received from "sooji".

When all of the unread dialogs 685, 687, 689, 691 among the dialogs received from "sooji" are not displayed on the touchscreen 603, the electronic device displays the content control menu 661 in order to display the unread dialogs not displayable on the touchscreen 603. At this point, the electronic device may perform automatic scrolling in order to display the non-displayable unread dialogs. Here, the electronic device may temporarily delay a scroll speed depending on the display area of one of the dialogs as described earlier. Here, as illustrated in FIG. 6D, the contents control menu 661 includes the "pause" icon 675 for temporarily suspending an automatic scrolling, the "slow" icon 665 for lowering a screen switching speed of the automatic scrolling, the "fast" icon 667 for raising a screen switching speed of the automatic scrolling, the "previous frame" icon 669 for displaying the previous screen by a currently displayed screen, the "next frame" icon 671 for displaying the next screen by a currently displayed screen, and the "display all" icon 673 for displaying a screen of a last unread message. At this point, as illustrated in FIG. 6C, the electronic device may display the content control menu 661 so that the message 659 is viewed. Also, as illustrated in FIG. 6D, the electronic device may display the contents control menu 661 on a separate region.

When detecting a touch for the "previous frame" icon 669 for the reference time or longer in FIG. 6D, the electronic device may display the dialog window of "Yelly" 623 where unread dialogs exist before "sooji" 629 in the dialog partner list 621 via the touchscreen 603 as illustrated in FIG. 6B. In this case, it is assumed that all of the unread dialogs of "John" 627 have been viewed.

In the above embodiment, the electronic device provides dialog window switching between dialog partners where unread dialogs exist in the same application via the contents control menu.

As illustrated in FIGS. 7A to 7D, the electronic device provides switching between applications in order to view content of unread contents existing in different applications via the contents control menu.

FIGS. 7A to 7E illustrate a procedure for viewing unread contents existing in applications that are not the same in an electronic device according to an embodiment of the present invention.

Figure 7A:
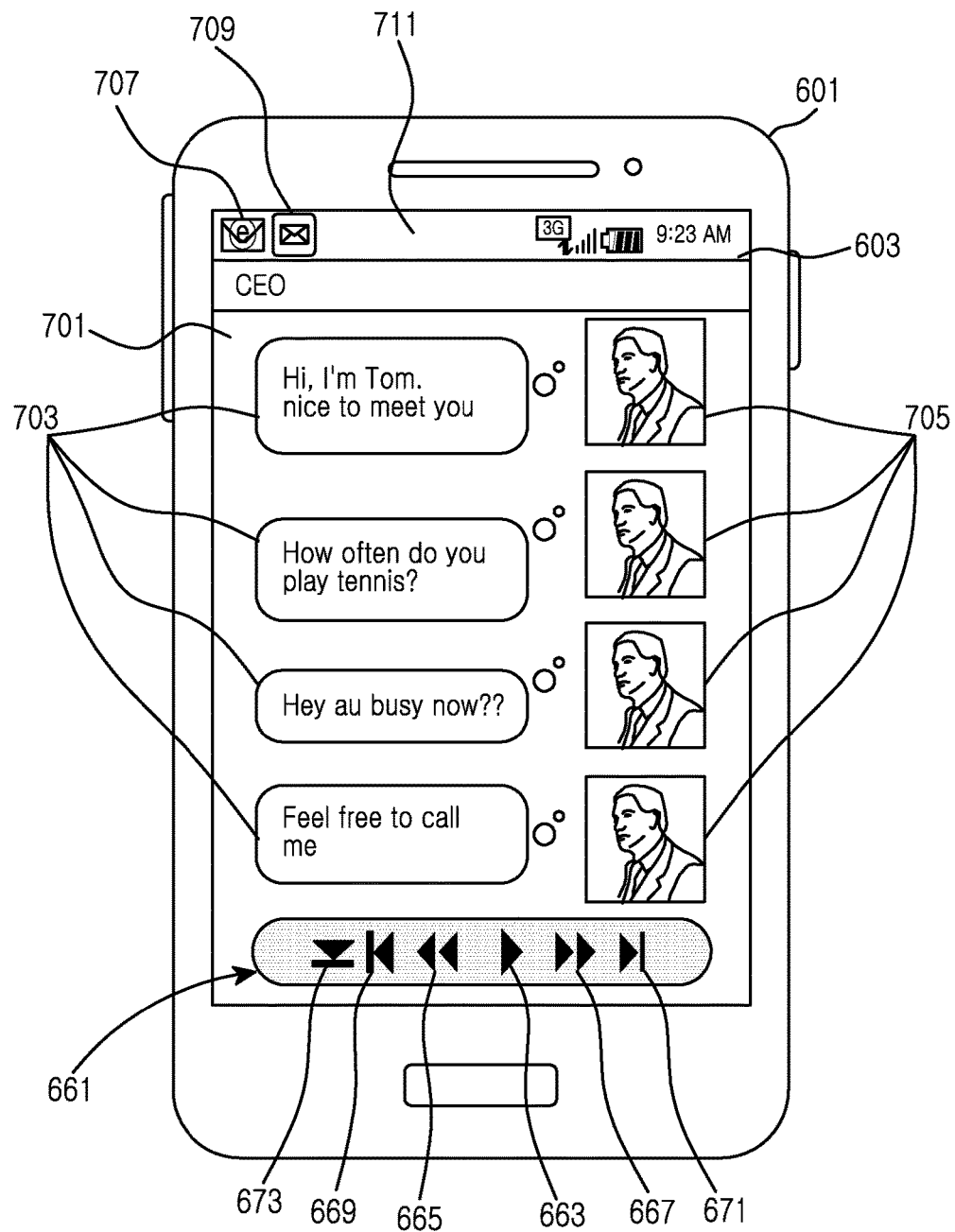
FIGS. 7A, 7B, 7C, 7D and 7E are views illustrating a screen configuration for displaying unread message contents of different applications in an electronic device according to an embodiment of the present invention.

Referring to FIG. 7A, the electronic device 601 displays the screen 701 of a messenger application, a notice region 711, and application icons 707 and 709 via the touchscreen 603. Here, the messenger application 701 displays one or more unread dialogs 703 among dialogs received from "CEO" and profile images 705. At this point, the electronic device 601 may display messages from a most recently received message or display messages from an oldest message received long ago with time reference at which a message has been received from "CEO". Here, the application icons 707 and 709 display contents such as unread messages, e-mails, dialogs, and contents (read/unread contents) of a similar form exist.

Figure 7B:
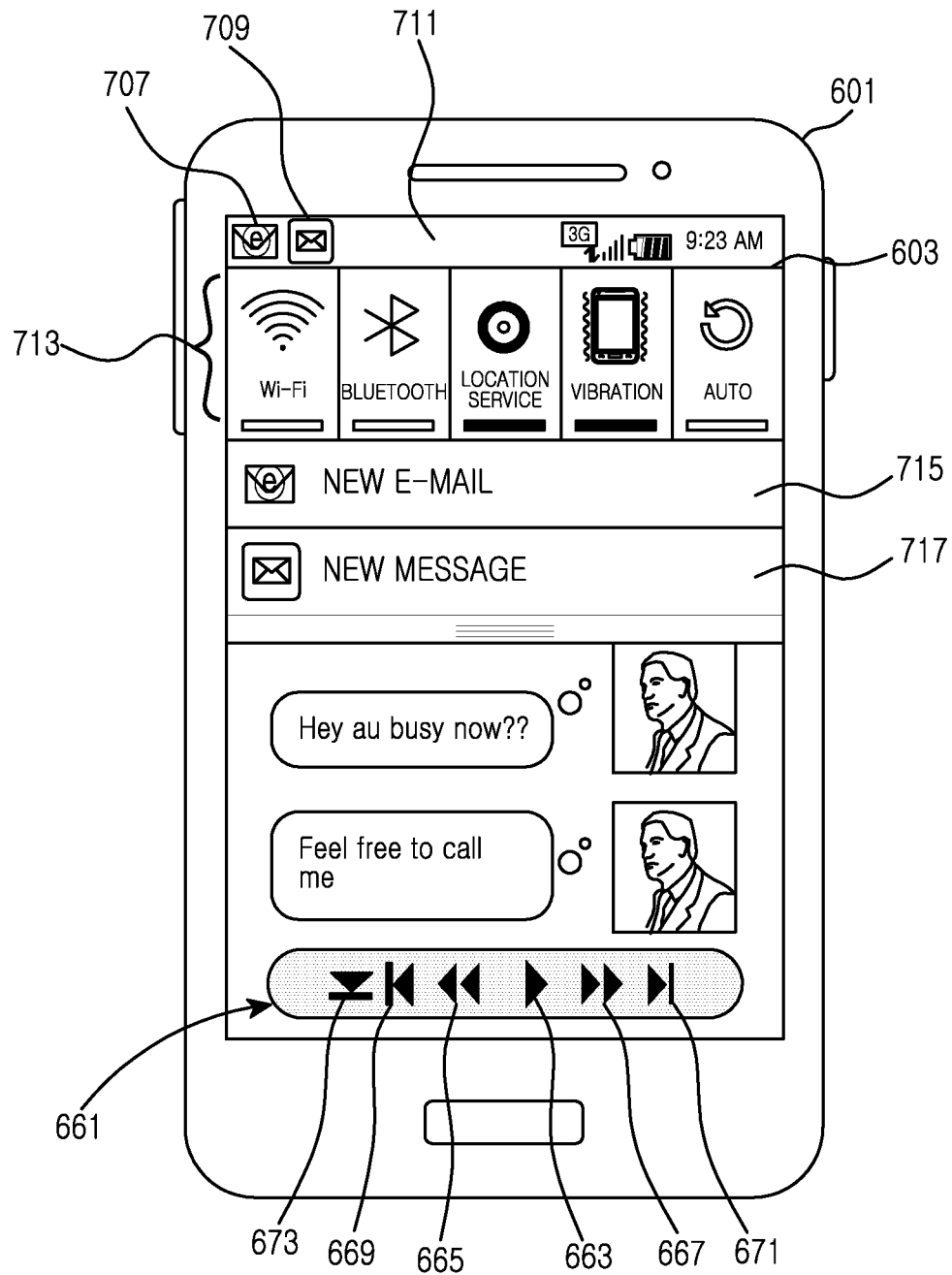

When all of the unread dialogs 703 among the dialogs received from "CEO" are not displayed or displayable on the touchscreen 603, the electronic device displays the content control menu 661 in order to display the unread dialogs not displayed or displayable on the touchscreen 603. Here, the electronic device may automatically perform scrolling in order to display the no-displayed unread dialogs. At this point, the electronic device may temporarily delay a scroll speed depending on the display area of one of the dialogs as described earlier As illustrated in FIG. 7A, the content control menu 661 includes the "reproduce" icon 663 for performing an automatic scroll mode, the "slow" icon 665 for lowering a screen switching speed of the automatic scroll mode, the "fast" icon 667 for raising a screen switching speed of the automatic scroll mode, the "previous frame" icon 669 for displaying the previous screen by a currently displayed screen, the "next frame" icon 671 for displaying the next screen by a currently displayed screen, and the "display all" icon 673 for displaying a screen of a last unread message. At this point, the electronic device may display the content control menu 661 so that dialog content is viewed. Also, the electronic device may display the content control menu 661 on a separate region independently. Meanwhile, icons 707 and 709 of applications including unread contents are displayed in the notice region 711. At this point, when a display extend event in the notice region 711 occurs by a user's manipulation, the electronic device displays a control panel 713 and notice messages 715 and 717 of an application indicating unread contents on the touchscreen 603 as illustrated in FIG. 7B.

Figure 7C:
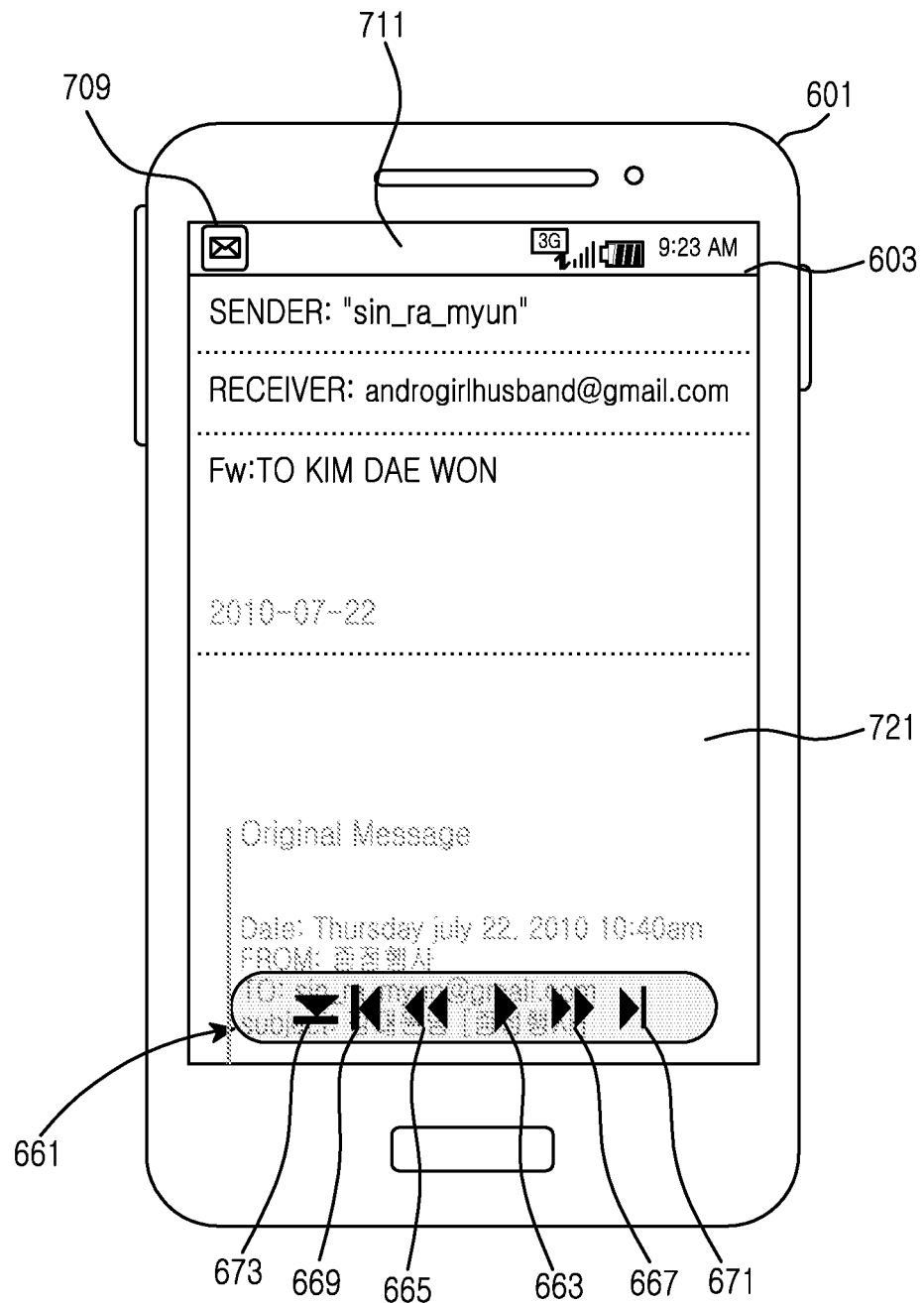

When an event for viewing unread contents in a different application occurs, the 25 electronic device displays content of unread contents in the different application on the screen. For example, as illustrated in FIG. 7A, when detecting a touch for the "next frame" icon 671 for the reference time or longer, the electronic device 601 displays the screen 721 of an e-mail application, the notice region 711, and the application icon 709 via the touchscreen 603 as illustrated in FIG. 7C. Here, though not limited thereto, the e-mail application program 721 may include caller information (name and address) and content.

Figure 7D:
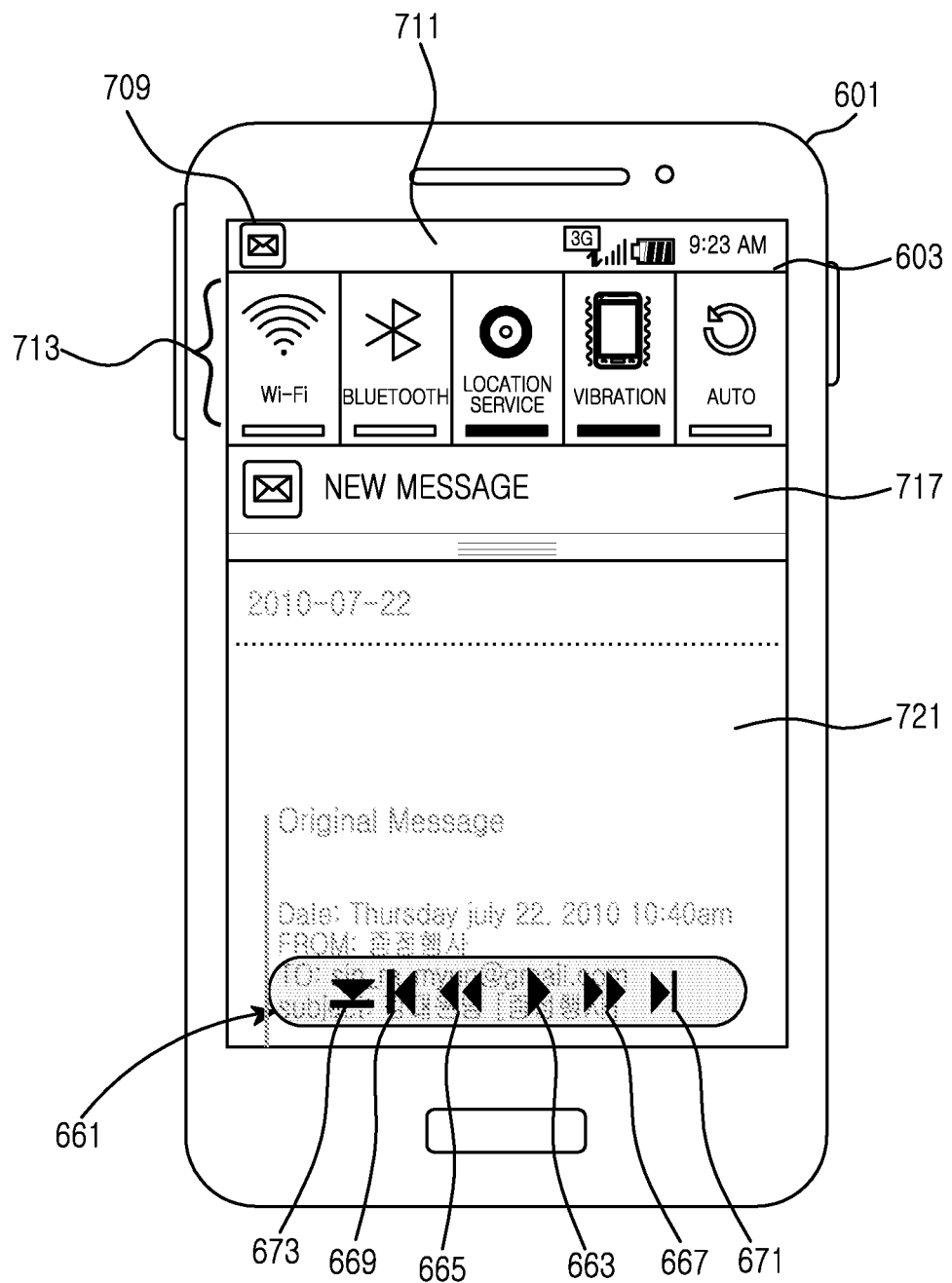

In the case where all of the content of a received unread e-mail is not displayed or displayable on the touchscreen 603, the electronic device displays the content control menu 661 in order to display those unread e-mails not displayed or displayable on the touchscreen 603 as illustrated in FIG. 7C. At this point, the electronic device may automatically perform scrolling in order to display the non-displayed contents of the unread e-mails. Here, the contents control menu 661 includes the "reproduce" icon 663 for performing an automatic scrolling, the "slow" icon 665 for lowering a screen switching speed of the automatic scrolling, the "fast" icon 667 for raising a screen switching speed of the automatic scrolling, the "previous frame" icon 669 for displaying the previous screen by a currently displayed screen, the "next frame" icon 671 for displaying the next screen by a currently displayed screen, and the "display all" icon 673 for displaying a screen of a last unread message. At this point, the electronic device may display the content control menu 661 so that the content of an e-mail is viewed. Also, the electronic device may display the content control menu 661 on a separate region independently from the content of the e-mail. Meanwhile, an icon 709 of an application including unread contents is displayed in the notice region 711. Again, if a display extend event of the notice region 711 occurs by a user's manipulation, the electronic device 601 displays the control panel 713 and the notice message 717 of an application including unread contents on the touchscreen 603 as illustrated in FIG. 7D.

Figure 7E:
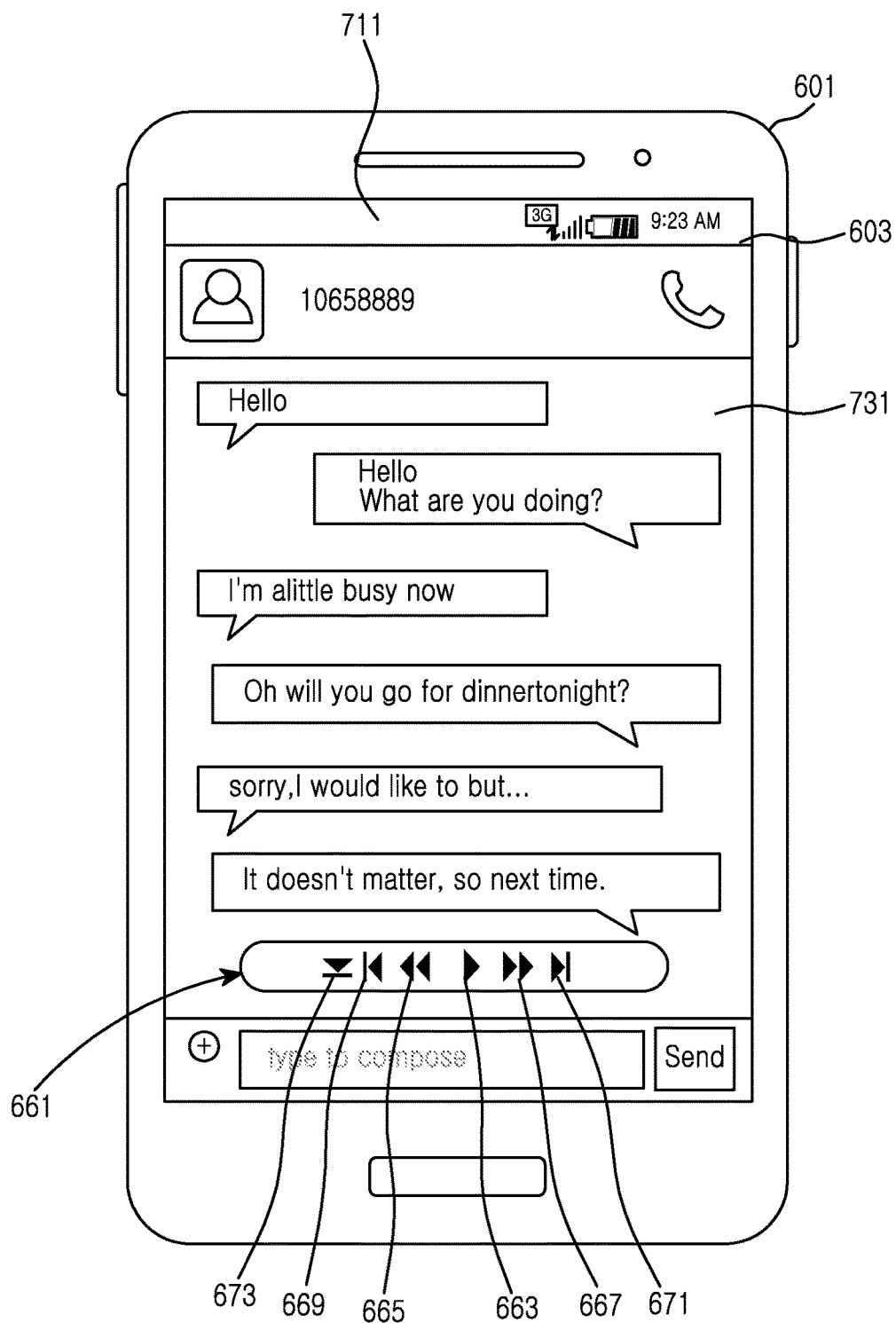

When an event for viewing unread contents in a different application occurs, the electronic device displays the content of the unread contents in the different application on the screen. For example, as illustrated in FIG. 7C, when detecting a touch for the "next frame" icon 671 for the reference time or longer, the electronic device 601 displays the screen 731 of a short message application and the notice region 711 via the touchscreen 603 as illustrated in FIG. 7E. Here, though not limited thereto, the short message application 731 may include caller information (name and phone number) and message content.

In the case where all of the content of a received unread short message is not displayed on the touchscreen 603, the electronic device displays the contents control menu 661 in order to display the content of the unread short message not displayed on the touchscreen 603 as illustrated in FIG. 7E. At this point, the electronic device may automatically perform scrolling at a predetermined rate in order to display the content of the not-displayed unread short message. At this point, the electronic device may temporarily delay the scrolling speed as described earlier.

In the above embodiment, the electronic device can view unread contents of different applications. At this point, the electronic device may include a separate system for managing existence of unread contents of the different applications.

As described above, since the electronic device performs automatic scrolling on the unread content of contents, a user of the electronic device can easily view the unread content of the contents.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for displaying incoming messages in an electronic device, the method comprising:
   executing a particular application associated with a plurality of unread messages, and an immediately preceding plurality of messages; and
   displaying the plurality of unread messages by automatically scrolling the plurality of unread messages across a screen of the electronic device, when all of the plurality of unread messages cannot be displayed in the screen at once,
   wherein the plurality of unread messages is scrolled at a speed that is selected by the electronic device based on a size of at least one of the plurality of unread messages,
   wherein the displaying further comprises detecting, by the electronic device, whether a size of a given unread message exceeds a threshold, wherein the threshold is a size that is less than a size of the screen where all of the plurality of unread messages at once, and, in response to the size of the given unread message exceeding the threshold, temporarily decreasing the speed at which the plurality of unread messages is scrolled until a display of the given unread message is completed, and, in response to the size of the given unread message being smaller than the threshold, the plurality of messages is scrolled at the speed, the speed being faster than the speed at which the plurality of unread messages is scrolled if the given unread message exceeds the threshold,
   displaying a content control menu on the screen for scrolling the plurality of unread messages, wherein the content control menu comprises a switch button; and
   responsive to selection of the switch button:
      when the immediately preceding plurality of messages includes an unread message, switching to a screen of the immediately preceding plurality of messages; and
      when the immediately preceding plurality of messages does not include an unread message, switching to a screen of another plurality of messages that includes an unread message.

2. The method of claim 1, wherein the content control menu comprises a play button for displaying the plurality of unread messages sequentially on the screen.

3. The method of claim 1, wherein the content control menu comprises a speed control button for controlling the speed at which the plurality of unread messages is scrolled.

4. The method of claim 1, wherein the content control menu further comprises a stop button for stopping a sequential display of the plurality of unread messages.

5. The method of claim 1, wherein the content control menu further comprises a cancel button for stopping a sequential display of the plurality of unread messages.

6. The method of claim 1, wherein the content control menu comprises a page up/down button for displaying the plurality of unread messages on a page basis.

7. The method of claim 1, wherein the content control menu is displayed translucently on the screen to overlap with the displayed plurality of unread messages.

8. The method of claim 1, wherein the content control menu is displayed in a region of the screen that is not occupied by the plurality of unread messages.

9. The method of claim 1, wherein the another plurality of unread message is from the same application.

10. The method of claim 1, wherein the scrolling is performed in sequence.

11. An electronic device for displaying incoming messages, comprising
   at least one processor;
   at least one touchscreen;
   at least one memory, wherein the at least one processor is configured to:
   execute a particular application associated with a plurality of unread messages, and an immediately preceding plurality of messages, and
   display the plurality of unread messages by automatically scrolling the plurality of unread messages across a screen of the electronic device when all of the plurality of unread messages cannot be displayed in the screen at once,
   wherein the plurality of unread messages is scrolled at a speed that is selected by the electronic device based on a size of at least one of the plurality of unread messages,
   wherein the displaying further comprises detecting, by the electronic device, whether a size of a given unread message exceeds a threshold, wherein the threshold is a size that is less than a size of the screen where all of the plurality of unread messages at once, and, in response to the size of the given unread message exceeding the threshold, temporarily decreasing the speed at which the plurality of unread messages is scrolled until a display of the given unread message is completed, and, in response to the size of the given unread message being smaller than the threshold, the plurality of unread messages is scrolled at the speed, the speed being faster than the speed at which the plurality of unread messages is scrolled if the given unread message exceeds the threshold,
   display a content control menu on the screen for scrolling the plurality of unread messages, wherein the content control menu comprises a switch button; and
   responsive to selection of the switch button:
      when the immediately preceding plurality of messages includes an unread message, switching to a screen of the immediately preceding plurality of messages; and
      when the immediately preceding plurality of messages does not include an unread message, switching to a screen of another plurality of messages that includes an unread message.

12. The electronic device of claim 11, wherein the content control menu comprises a play button for sequentially displaying the plurality of unread messages on the screen.

13. The electronic device of claim 11, wherein the content control menu further comprises:
a speed control button for controlling the speed at which the plurality of unread messages is scrolled.

14. The electronic device of claim 11, wherein the content control menu further comprises:
a stop button for stopping a sequential display of the plurality of unread messages.

15. The electronic device of claim 11, wherein the content control menu further comprises:
a cancel button for stopping a sequential display of the plurality of unread messages.

16. The electronic device of claim 11, wherein the content control menu further comprises:
a page up/down button for displaying the plurality of unread messages on a page basis.

17. The electronic device of claim 11, wherein the content control menu is displayed translucently on the screen to overlap with the displayed plurality of unread messages.

18. The electronic device of claim 11, wherein the content control menu is displayed in a region of the screen that is not occupied by the plurality of unread messages.

19. The electronic device of claim 11, wherein the scrolling is performed on a pixel basis.

20. The electronic device of claim 11, wherein the scrolling is performed in sequence.

\* \* \* \* \*